3,445,198
ATMOSPHERE REGENERANTS AND METHOD OF PREPARING SAME
Ricardo O. Bach, Gastonia, N.C., and William W. Boardman, Jr., Longview, Tex., assignors, by mesne assignments, to Lithium Corporation of America, New York, N.Y., a corporation of Delaware
No Drawing. Filed Apr. 9, 1964, Ser. No. 358,627
Int. Cl. C01d *11/02*
U.S. Cl. 23—315          16 Claims

ABSTRACT OF THE DISCLOSURE

Atmosphere regenerants in the form of lithium peroxide addition compounds, in particular, lithium peroxide addition compounds resulting from the action of strong hydrogen peroxide on solid, substantially anhydrous lithium peroxide. The compounds are prepared by forming a reaction mixture in the form of a slurry containing lithium peroxide and an essentially inert organic liquid, and then adding the hydrogen peroxide at a rate to maintain the temperature of the reaction mixture below 10° C.

---

Atmosphere regenerants have important uses in environments for sustaining life as, for instance, in manned sealed environments. The principal function of such regenerants is to absorb carbon dioxide from breathed air and to restore the original oxygen content to the sealed environment. Ideally, an atmosphere regenerant should be capable of absorbing carbon dioxide and releasing oxygen at a rate adequate to satisfy the normal demands of human metabolism. In addition, in accomplishing this result, the regenerant should be stable under the conditions present in the sealed environment and, while manifesting high carbon dioxide absorbing and oxygen releasing capacity, should not prohibitively increase the size and/or weight of the atmosphere regenerating system.

In accordance with the present invention, novel compounds have been evolved having utility as atmosphere regenerants. Generically speaking, the compounds of this invention may be referred to as lithium peroxide peroxihydrate hydrates. More specifically, the atmosphere regenerants of the present invention are lithium peroxide addition compounds, in particular, lithium peroxide addition compounds formed by the action of hydrogen peroxide on lithium peroxide. The atmosphere regenerants of this invention may contain hydrate water in which case they may be denoted as lithium peroxide peroxihydrate hydrates. Generally speaking, the atmosphere regenerants of the present invention correspond to the general formula

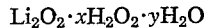

$$Li_2O_2 \cdot xH_2O_2 \cdot yH_2O$$

wherein $x$ is 0.6 to 1.5, and $y$ is 0 to 0.3.

In accordance with one aspect of this invention, atmosphere regenerants having the structure indicated are prepared by a novel, yet simple, method which includes reacting lithium peroxide and hydrogen peroxide under certain conditions described hereafter in detail. The lithium peroxide advantageously is utilized in the form of a solid and is substantially anhydrous in character. In order to obtain a product having maximum carbon dioxide absorbing and oxygen releasing properties per unit weight of regenerant, the lithium peroxide employed should have a purity of at least 90%, and especially desirably 95% or more, usually 97% to 98%, or higher.

The hydrogen peroxide utilized in the formation of the atmosphere regenerants of this invention advantageously is in the form of an aqueous solution containing from 50 to 98 weight percent of hydrogen peroxide. There are a number of such solutions available commercially, among these being the products sold under the trademark "Becco." From the standpoint of weight and volume considerations, as well as from the standpoint of the problems presented in handling and controlling excess moisture in a sealed environment of the type in which the atmosphere regenerants of this invention have utility, the regenerants desirably should contain no hydrate water or should have as low a hydrate water content as possible. Thus, while the strength of the hydrogen peroxide solutions having utility for the purposes of this invention is variable, it is preferred that the strength of the solutions be as high as possible to reduce the hydrate water content of the regenerants to minimal levels. In applying this criterion to the preparation of the atmosphere regenerants of this invention, the molar hydrate water content thereof can be maintained within the range 0 to 0.3, usually 0.1 to 0.2.

In forming the atmosphere regenerants of the present invention, the proportions of lithium peroxide and hydrogen peroxide utilized conform generally to the formula hereinabove set forth, that is, a molar ratio of lithium peroxide to hydrogen peroxide of 1 of the lithium peroxide to 0.6 to 1.5 of the hydrogen peroxide, usually 1 of the lithium peroxide to 0.7 to 1.0 of the hydrogen peroxide. In accordance with a preferred practice of the invention, the hydrogen peroxide is used in slight excess, of the order of 5 to 15%, usually 7 to 10%, over theoretical or stoichiometrical proportions, to compensate for any decomposition of the hydrogen peroxide during the formation of the atmosphere regenerants.

To obtain the desired atmosphere regenerants, the lithium peroxide advantageously is slurried with an organic liquid which is essentially non-reactive with respect to the reactants and the product formed therefrom, or, if reactive with respect to the product, is of a character such that it can be readily cleaved or separated from the product. The organic liquid functions to provide a vehicle for facilitating contact between the solid lithium peroxide and the hydrogen peroxide during formation of the regenerants. Examples of organic liquids having utility for the purposes of this invention are methanol, acetone and pentane. Pentane is especially preferred because of the ease in removing it from the product. The slurry desirably is cooled prior to adding the hydrogen peroxide. The temperature to which the slurry is cooled at this stage is variable. Generally speaking, addition of the hydrogen peroxide may be commenced when the slurry is at a temperature of about 0° C. Lower slurry temperatures, ranging from −30° C. to −50° C., however, may be used. Generally speaking, for best results, the hydrogen peroxide should be added to the slurry at a rate such that the temperature of the slurry during the formation of the regenerants does not exceed 10° C. The solid phase in the reaction medium after all of the hydrogen peroxide has been added is essentially the desired lithium peroxide peroxihydrate hydrate which readily can be separated by known filtration or equivalent procedures, and dried. In carrying out the various product separation steps, the product advantageously is maintained at temperatures below room temperature, generally at from 0 to 10° C.

While the atmosphere regenerants of the present invention have good stability at temperatures below room temperature or 25° C., the stability thereof can be improved by inclusion of minor amounts of stabilizers. The stabilizers can be introduced into the product during the formation thereof, or by physically admixing them with the product after the product has been separated from the reaction mixture and dried. Incorporation of the stabilizer or stabilizers into the product during the formation thereof may be conveniently accomplished by either dispersing it in the lithium peroxide liquid solvent slurry, or by dissolving it in the hydrogen peroxide, prior to the addition of the hydrogen peroxide to the slurry.

A number of inorganic agents have been found to have utility for improving the stability of the atmosphere regenerants of the present invention, illustrative examples of which are lithium chloride, aluminum chloride, stannic chloride, antimony pentachloride, sodium stannate, and silica gel. The quantity of stabilizing agent employed to attain the desired stabilizing effect can be varied. Generally speaking, good results are obtained with only small quantities, from 0.1% to 4%, usually 1 to 3% by weight, of the total composition.

The following examples are illustrative of the above described procedures which have been found to be highly useful in producing the atmosphere regenerants of this invention. It will be understood that various changes can be made therein in the light of the guiding principles disclosed above without in any manner departing from the fundamental teachings contained herein.

EXAMPLE 1

92 grams of lithium peroxide were slurried in 250 ml. of methanol. The slurry was cooled to −50° C. and 56 grams of cold 98% hydrogen peroxide were added to the slurry at a rate such that the temperature of the slurry remained btween −300° C. and −50° C. After all of the hydrogen peroxide had been added, the slurry was pressure-filtered under $CO_2$-free air. The product was rinsed several times with methanol, pressure-filtered, and then dried at a temperature of 0° C. by passing dry $CO_2$-free air through it. Analysis of the product shown an empirical formula corresponding to $Li_2O_2 \cdot 0.74H_2O_2 \cdot 0.09H_2O$.

EXAMPLE 2

46 grams of lithium peroxide were slurried in 200 ml. of pentane. The slurry was cooled to −30° C. and 28 grams of cold 98% hydrogen peroxide containing 1 gram of lithium chloride were added to the slurry at a rate such that the temperature of the slurry remained below −10° C. Following addition of all of the hydrogen peroxide, the slurry was pressure-filtered under $CO_2$-free air. The product was rinsed with pentane, pressure-filtered, and then dried by passing dry argon gas through the product while maintaining the product at a temperature of 10° C. Analysis of the product showed an empirical formula corresponding to $Li_2O_2 \cdot 0.8H_2O_2 \cdot 0.18H_2O$. The lithium chloride was present in the product in an amount corresponding to 1.4% of the total weight of the product.

EXAMPLE 3

23 grams of lithium peroxide were slurried in 200 ml. of pentane. The slurry was cooled to 2° C. and 18.2 grams of cold 98% hydrogen peroxide containing 0.2 gram of aluminum trichloride were added to the slurry at a rate such that the temperature of the slurry remained between 2° C. and 6° C. After all of the hydrogen peroxide had been added, the slurry was pressure-filtered under $CO_2$-free air. The product was washed with pentane, pressure-filtered as before, and then dried at 0° C. by air purging. Analysis showed an empirical formula corresponding to $Li_2O_2 \cdot 0.98H_2O_2 \cdot 0.17H_2O$ for the product. The aluminum trichloride was present in an amount corresponding to 0.53% of the total weight of the product

EXAMPLE 4

23 grams of lithium peroxide and 0.8 gram of silica gel ($SiO_2$) were slurried in 200 ml. of pentane. The slurry was cooled to −1° C. and 18.2 grams of cold 98% hydrogen peroxide were added to the slurry at a rate such that the temperature of the slurry did not rise above 5° C. After all of the hydrogen peroxide had been added, the slurry was pressure-filtered under an argon flow at 0° C. The product was rinsed with pentane, pressure-filtered, and then dried at 0° C. by air purging. Analysis of the product showed an empirical formula corresponding to $Li_2O_2 \cdot 1.5H_2O_2 \cdot 0.14H_2O$. The silica gel constituted 2% of the total weight of the product.

The atmosphere regenerants obtained as described above were tested for their capacity to absorb carbon dioxide and release oxygen. The tests were performed by forming a bed of the regenerant and passing a 3.8% carbon dioxide-air mixture therethrough at various flow rates. Standard equipment was employed. The results were as follows:

TABLE

| Material | Analyses (mmoles/g) | | | | $CO_2$ balance (mmoles) | | | $O_a$ balance (mmoles) | | Percent conversion | | R.Q.[1] $O_a$ loss/$CO_2$ gain |
|---|---|---|---|---|---|---|---|---|---|---|---|---|
| | Before | | After | | | | | | | | | |
| | $O_a$ | $Li_2O$ | $O_a$ | $Li_2O$ | Added | Required | Gain | Initial | Lost | Based on $O_a$ | Based on $CO_2$ Req'd | |
| Ex. 1 | 11.7 | 13.5 | 4.2 | 4.2 | 46.7 | 33.4 | 24.2 | 29.2 | 18.3 | 63 | 72 | 0.75 |
| Ex. 2 | 11.5 | 12.8 | 5.0 | 1.7 | 28.8 | 28.2 | 21.4 | 25.4 | 13.9 | 55 | 74 | 0.67 |
| Ex. 3 | 11.8 | 12.0 | 6.1 | 3.3 | 12.7 | 12.0 | 8.2 | 11.8 | 5.1 | 43 | 68 | 0.63 |
| Ex. 4 | 12.0 | 9.9 | 7.6 | 1.6 | 11.7 | 10.2 | 8.5 | 11.8 | 8.9 | 73 | 83 | 1.05 |

[1] Respiration Quotient. The "Respiration Quotient" of an atmosphere regenerant is determined from the ratio of its contained moles of active oxygen ($O_a$) to its contained moles of alkali oxide ($M_2O$). For man under normal conditions, the Respiration Quotient of an atmosphere regenerant ideally should be about 0.8. Under abnormal conditions of environment and under special dietary conditions (high carbohydrate intake) the Respiration Quotient of an atmosphere regenerant ideally should approach 0.9.

What is claimed is:

1. A compound useful as an atmosphere regenerant corresponding to the formula $$Li_2O_2 \cdot xH_2O_2 \cdot yH_2O$$

wherein $x$ is 0.6 to 1.5 and $y$ is 0 to 0.3.

2. A composition useful as an atmosphere regenerant comprising an intimate mixture of a compound corresponding to the general formula $$Li_2O_2 \cdot xH_2O_2 \cdot yH_2O$$

wherein $x$ is 0.6 to 1.5 and $y$ is 0 to 0.3, and a minor proportion of a stabilizing agent.

3. A composition useful as an atmosphere regenerant comprising an intimate mixture of a compound corresponding to the general formula $$Li_2O_2 \cdot xH_2O_2 \cdot yH_2O$$

wherein $x$ is 0.6 to 1.5 and $y$ is 0 to 0.3, and from 0.1% to 4%, by weight, of an inorganic stabilizing agent.

4. A lithium peroxide addition compound of hydrogen peroxide useful as an atmosphere regenerant having a formula generally corresponding to $$Li_2O_2 \cdot 0.7H_2O_2 \cdot 0.1H_2O$$

5. A composition useful as an atmosphere regenerant comprising an intimate mixture of a compound corresponding to the general formula $$Li_2O_2 \cdot 0.7H_2O_2 \cdot 0.1H_2O$$

and from 0.1 to 4%, by weight, of an inorganic stabilizing agent.

6. A composition useful as an atmosphere regenerant comprising an intimate mixture of a compound corresponding to the general formula $$Li_2O_2 \cdot xH_2O_2 \cdot yH_2O$$

wherein $x$ is 0.6 to 1.5 and $y$ is 0 to 0.3, and from about 1 to 2%, by weight, of LiCl.

7. A composition useful as an atmosphere regenerant comprising an intimate mixture of a compound corresponding to the general formula $$Li_2O_2 \cdot xH_2O_2 \cdot yH_2O$$

wherein $x$ is 0.6 to 1.5 and $y$ is 0 to 0.3, and about 1 to 3% by weight, of silica gel.

8. A composition useful as an atmosphere regenerant comprising an intimate mixture of a compound corresponding to the general formula $$Li_2O_2 \cdot xH_2O_2 \cdot yH_2O$$

wherein $x$ is 0.6 to 1.5 and $y$ is 0 to 0.3, and about 1 to 2%, by weight, of $AlCl_3$.

9. A composition useful as an atmosphere regenerant comprising an intimate mixture of a compound corresponding to the general formula $$Li_2O_2 \cdot xH_2O_2 \cdot yH_2O$$

wherein $x$ is 0.6 to 1.5 and $y$ is 0 to 0.3, and about 0.2 to 2%, by weight, of $SbCl_5$.

10. A method of preparing a compound useful as an atmosphere regenerant comprising the steps of forming a reaction mixture, in the form of a slurry, containing substantially anhydrous lithium peroxide and an organic liquid, said organic liquid being selected from the group consisting of organic liquids which are essentially nonreactive with respect to lithium peroxide and hydrogen peroxide and the products formed therefrom and organic liquids which are reactive with respect to the product formed from the reaction of lithium peroxide with hydrogen peroxide and can be removed from said product, adding strong hydrogen peroxide to the slurry at a rate to maintain the temperature of the slurry below the decomposition temperature of the compound formed, and recovering a compound from the reaction mixture corresponding to the general formula $Li_2O_2 \cdot xH_2O_2 \cdot yH_2O$ wherein $x$ is 0.6 to 1.5 and $y$ is 0 to 0.3.

11. A method of preparing a lithium peroxide addition compound of hydrogen peroxide useful as an atmosphere regenerant comprising the steps of forming a reaction mixture, in the form of a slurry, containing substantially anhydrous solid lithium peroxide and an organic liquid, said organic liquid being selected from the group consisting of organic liquids which are essentially non-reactive with respect to lithium peroxide and hydrogen peroxide and the products formed therefrom and organic liquids which are reactive with respect to the product formed from the reaction of lithium peroxide with hydrogen peroxide and can be removed from said product, cooling the slurry to about 0° C., adding aqueous hydrogen peroxide of from 50% to 98% strength by weight to the slurry at a rate to maintain the temperature of the slurry below 10° C., and recovering from the reaction mixture a compound corresponding to the general formula $Li_2O_2 \cdot xH_2O_2 \cdot yH_2O$ wherein $x$ is 0.6 to 1.5 and $y$ is 0 to 0.3.

12. A method of preparing a composition useful as an atmosphere regenerant comprising the steps of forming a reaction mixture, in the form of a slurry, containing substantially anhydrous lithium peroxide and an organic liquid, said organic liquid being selected from the group consisting of organic liquids which are essentially nonreactive with respect to lithium peroxide and hydrogen peroxide and the products formed therefrom and organic liquids which are reactive with respect to the product formed from the reaction of lithium peroxide with hydrogen peroxide and can be removed from said product, adding strong hydrogen peroxide and a minor amount of an inorganic stabilizing agent to the slurry at a rate to maintain the temperature of the slurry at a level compatible with the formation of a reaction product between the lithium peroxide and the hydrogen peroxide corresponding to the general formula $Li_2O_2 \cdot xH_2O_2 \cdot yH_2O$ wherein $x$ is 0.6 to 1.5 and $y$ is 0 to 0.3, and separating the organic liquid from the reaction mixture.

13. A method of preparing a composition useful as an atmosphere regenerant comprising the steps of forming a reaction mixture, in the form of a slurry, containing substantially anhydrous lithium peroxide and an organic liquid together with an inorganic stabilizing agent in an amount sufficient to provide from about 0.1% to about 4%, by weight, of the stabilizing agent in the composition, said organic liquid being selected from the group consisting of organic liquids which are essentially non-reactive with respect to lithium peroxide and hydrogen peroxide and the products formed therefrom and organic liquids which are reactive with respect to the product formed from the reaction of lithium peroxide with hydrogen peroxide and can be removed from said product, adding aqueous hydrogen peroxide of about 98% strength by weight to the slurry at a rate to maintain the temperature of the slurry at a level compatible with the formation of a reaction product between the lithium peroxide and the hydrogen peroxide, and recovering a composition from the reaction mixture corresponding to the general formula $Li_2O_2 \cdot xH_2O_2 \cdot yH_2O$ wherein $x$ is 0.6 to 1.5 and $y$ is 0 to 0.3.

14. A method of preparing a lithium peroxide addition compound of hydrogen peroxide useful as an atmosphere regenerant comprising the steps of forming a reaction mixture, in the form of a slurry, containing substantially anhydrous solid lithium peroxide and an organic liquid, said organic liquid being selected from the group consisting of organic liquids which are essentially non-reactive with respect to lithium peroxide and hydrogen peroxide and the products formed therefrom and organic liquids which are reactive with respect to the product formed from the reaction of lithium peroxide with hydrogen peroxide and can be removed from said product, cooling the slurry to a temperature below 0° C., adding aqueous hydrogen peroxide of about 98% strength by weight to the slurry at a rate to maintain the temperature of the slurry between about 0° C. to about 10° C., and recovering a product corresponding to the general formula $$Li_2O_2 \cdot xH_2O_2 \cdot yH_2O$$

wherein $x$ is 0.6 to 1.5 and $y$ is 0 to 0.3.

15. A method of preparing a lithium peroxide addition compound of hydrogen peroxide useful as an atmosphere regenerant comprising reacting in a substantially inert organic liquid medium substantially anhydrous lithium peroxide and strong hydrogen peroxide in approximately stoichiometric proportions to produce a compound corresponding to the general formula $$Li_2O_2 \cdot xH_2O_2 \cdot yH_2O$$

wherein $x$ is 0.6 to 1.5 and $y$ is 0 to 0.3 while maintaining the temperature of the organic liquid medium at a level compatible with the formation of the said compound, and recovering the compound from the said medium.

16. A method of preparing a lithium peroxide addition compound of hydrogen peroxide useful as an atmosphere regenerant comprising the steps of forming a reaction mixture, in the form of a slurry, containing substantially anhydrous solid lithium peroxide and an organic liquid, said organic liquid being selected from the group consisting of organic liquids which are essentially non-reactive with respect to lithium peroxide and hydrogen peroxide and the products formed therefrom and organic liquids which are reactive with respect to the product formed from the reaction of lithium peroxide with hydrogen peroxide and can be removed from said product, cooling the reaction mixture to a temperature below 0° C., adding aqueous hydrogen peroxide of about 98% strength by weight to the reaction mixture at a rate to maintain the temperature hereof below about 10° C., the lithium peroxide and hydrogen peroxide being present in the reaction mixture in approximately stoichiometric proportions to produce a compound corresponding to the general formula $$Li_2O_2 \cdot xH_2O_2 \cdot yH_2O$$

wherein $x$ is 0.6 to 1.5 and $y$ is 0 to 0.3, and recovering the compound from the reaction mixture.

No references cited.

EARL C. THOMAS, *Primary Examiner.*

H. S. MILLER, *Assistant Examiner.*

U.S. Cl. X.R.

23—4